United States Patent [19]

Rees

[11] Patent Number: 4,768,556
[45] Date of Patent: Sep. 6, 1988

[54] BRAKE SYSTEM AND RELAY VALVES FOR RAILROAD TRAINS

[76] Inventor: James G. Rees, 1212 N. Lake Shore Dr., Chicago, Ill. 60610

[21] Appl. No.: 926,034

[22] Filed: Oct. 31, 1986

[51] Int. Cl.⁴ .......................................... F16K 31/126
[52] U.S. Cl. ............................. 137/627.5; 137/630.15; 303/28; 303/40
[58] Field of Search ........... 137/627.5, 630.14, 630.15; 303/28, 40, 54

[56] References Cited

U.S. PATENT DOCUMENTS

| | | | |
|---|---|---|---|
| 2,259,809 | 10/1941 | Freeman | 137/630.15 X |
| 3,631,894 | 1/1972 | Frantz | 137/630.15 |
| 3,945,401 | 3/1976 | Greenwood | 137/627.5 |
| 3,961,645 | 6/1976 | Kagen | 137/630.15 |
| 4,484,668 | 11/1984 | Williamson | 303/40 X |

Primary Examiner—Robert G. Nilson
Attorney, Agent, or Firm—Todd S. Parkhurst

[57] ABSTRACT

A braking system for railroad freight trains and a novel relay valve for use in the system are disclosed. The relay valve permits the brake system to be configured so that the requirement for expensive control valves is minimized. The novel relay valve is interposed between the control valve and a number of brake cylinders. Upon a signal from the control valve, the relay valve delivers brake air to the cylinders from a pre-charged reservoir or other source. The novel relay valve includes primary and secondary flow valves to cause air to be delivered to the brakes in a controlled manner. An exhaust valve arrangement in the relay valve permits the brakes to be released.

9 Claims, 5 Drawing Sheets

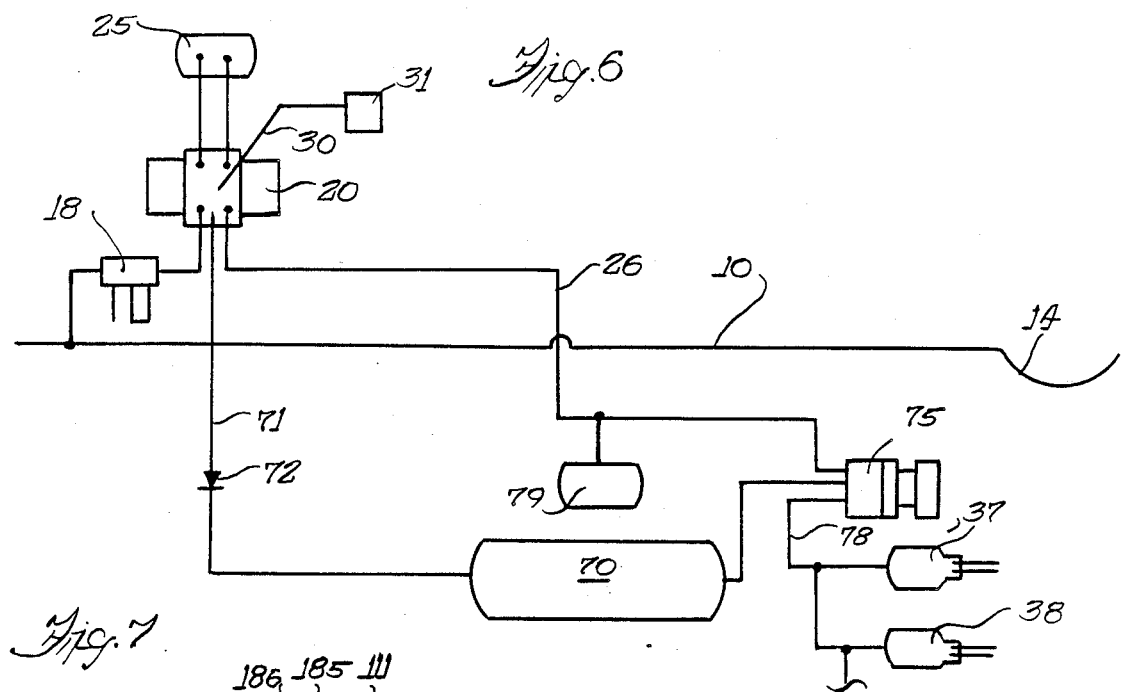
Fig. 6
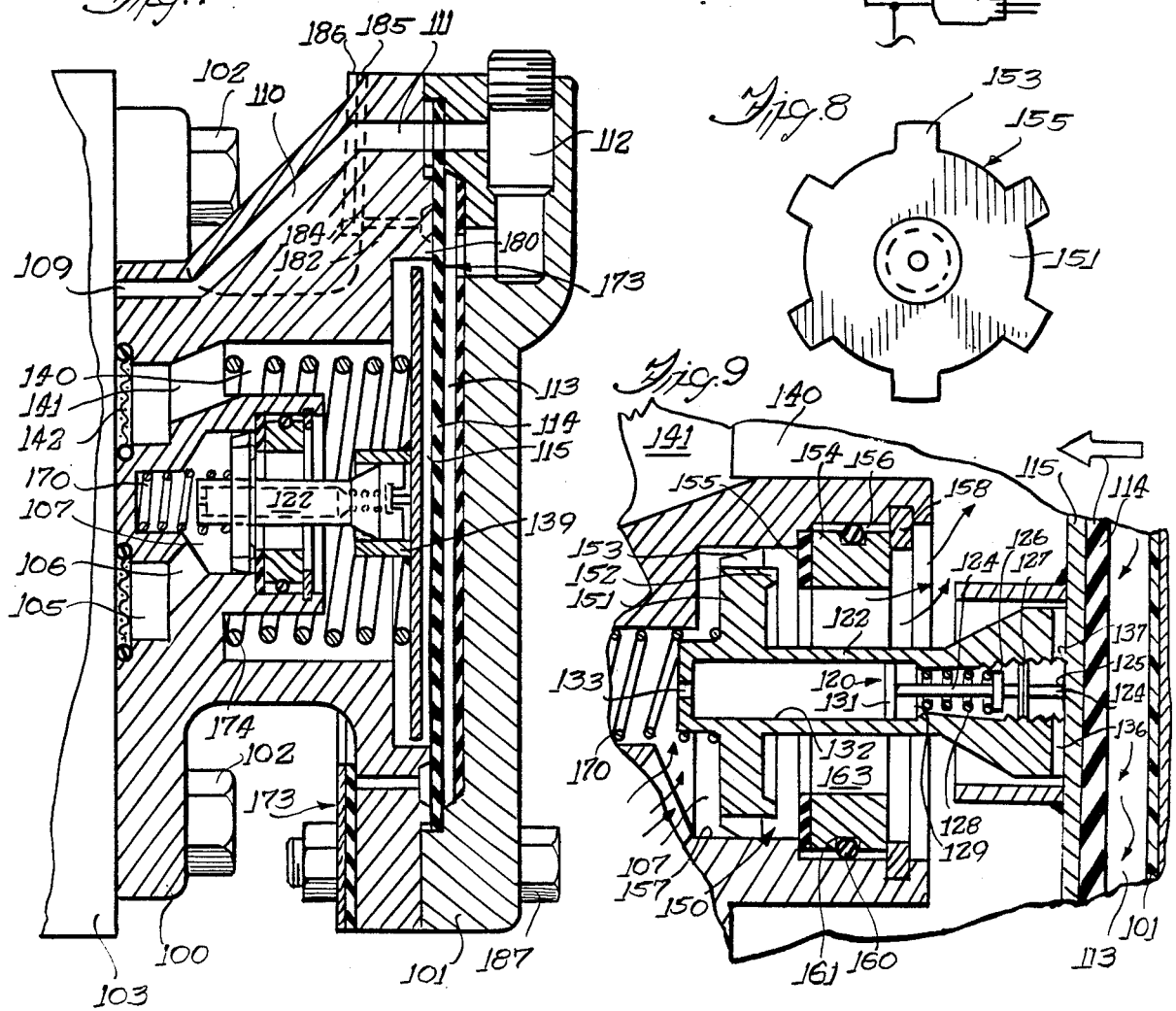
Fig. 7
Fig. 8
Fig. 9

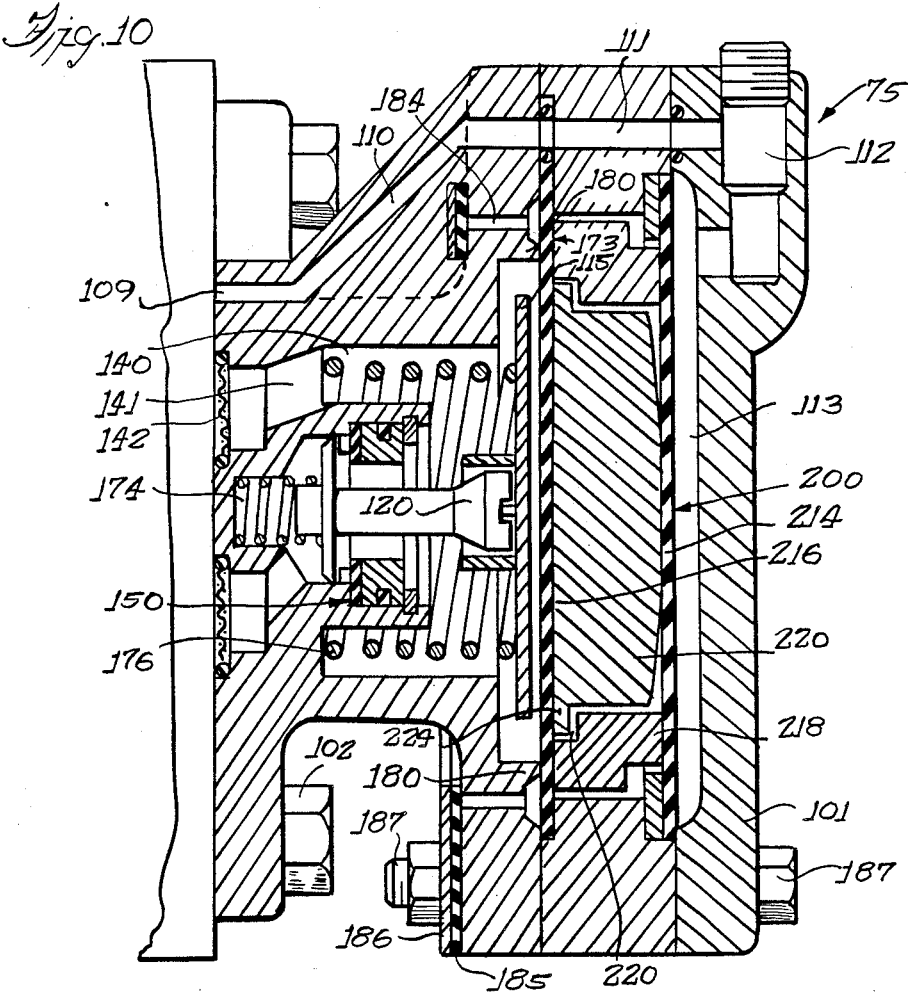
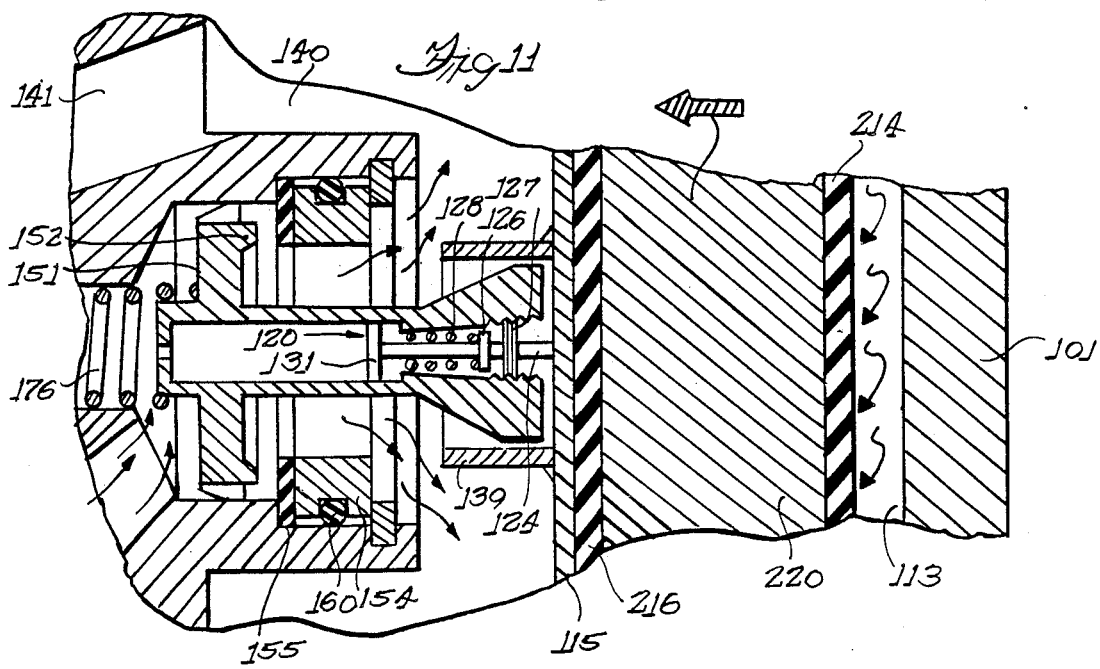

4,768,556

BRAKE SYSTEM AND RELAY VALVES FOR RAILROAD TRAINS

This invention relates generally to brakes and brake control systems for railroad freight trains and freight cars. More particularly, it concerns a novel relay valve and associated brake system for use with the cars comprising a railroad freight train.

Effective yet efficient railroad car brakes and brake systems are essential to modern railroad freight operations. Common brake systems include a brake pipe running from the train engine to the last car in the train; when in operation, this brake pipe is pressurized by a supply of compressed air. An arrangement of valves and conduits leads from the brake pipe to brake cylinders associated with each railroad car truck or to each railroad car wheel. In general, these braking systems are designed so as to apply a relatively uniform braking force to each car wheel when the pressure in the brake pipe is reduced or otherwise altered. Although a variety of brake system arrangements and valves have been proposed, some forms of standardization are required if cars and car brake systems of varying sorts are to be coupled together in a freight train having a unified and effective overall braking system.

Those familiar with the design and construction of railroad brake systems will understand that the control valves used in these systems are expensive; such valves can cost $1500 or more. Many such valves are required on a long train, because each control valve can properly operate only one or a few brake cylinders.

It is the general object of the present invention to offer a brake system for railroad trains which is reliable and rugged, yet which is simple in operation.

An associated object is to minimize the number of expensive control valves required in a brake system, so as to thereby offer a brake system at an attractive cost.

As a corollary, it is an object to offer a relay valve which permits a brake system to be designed and constructed so as to have a minimum number of expensive control valves and other parts. An associated object is to provide a relay valve which is itself reliable and rugged, and which can be offered at an attractive cost.

Yet another object is to provide a braking system in which braking action of maximum effectiveness is available at all railroad car wheels and yet in which the system requires only a minimum number of expensive control valves for proper operation.

SUMMARY OF THE INVENTION

To meet these objectives, a brake system is disclosed in which a novel relay valve is used. This relay valve permits a system configuration in which the requirement for expensive control valves is minimized.

The novel relay valve is interposed between the control valve and a number of brake cylinders. Upon a signal from the control valve, the relay valve delivers brake air to the cylinders from a pre-charged reservoir or other source. The novel relay valve includes primary and secondary flow valves to cause air to be delivered to the brakes in a controlled manner. An exhaust valve arrangement in the relay valve permits the brakes to be released.

Other objects, aspects and advantages of the invention will become apparent upon reading the following detailed description and upon reference to the drawings. Throughout the drawings, like reference numerals refer to like parts.

BRIEF DESCRIPTION OF THE DRAWINGS

FIG. 6 is a schematic illustration of another novel braking system utilizing the novel relay;

FIG. 7 is a sectional view of a first embodiment of the novel relay valve;

FIG. 8 is an elevational view of a spider member used in the valve illustrated in FIG. 7;

FIG. 9 is an enlarged fragmentary sectional view similar to FIG. 7 but showing interior portions of the valve in further detail;

FIG. 10 is a sectional view similar to FIG. 7 but showing an alternate embodiment of the novel relay valve;

FIG. 11 is an enlarged fragmentary sectional view similar to FIG. 9 but showing the alternate-embodiment valve parts of FIG. 10 in further detail.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included with the spirit and scope of the invention as defined by the appended claims.

Figure 1:
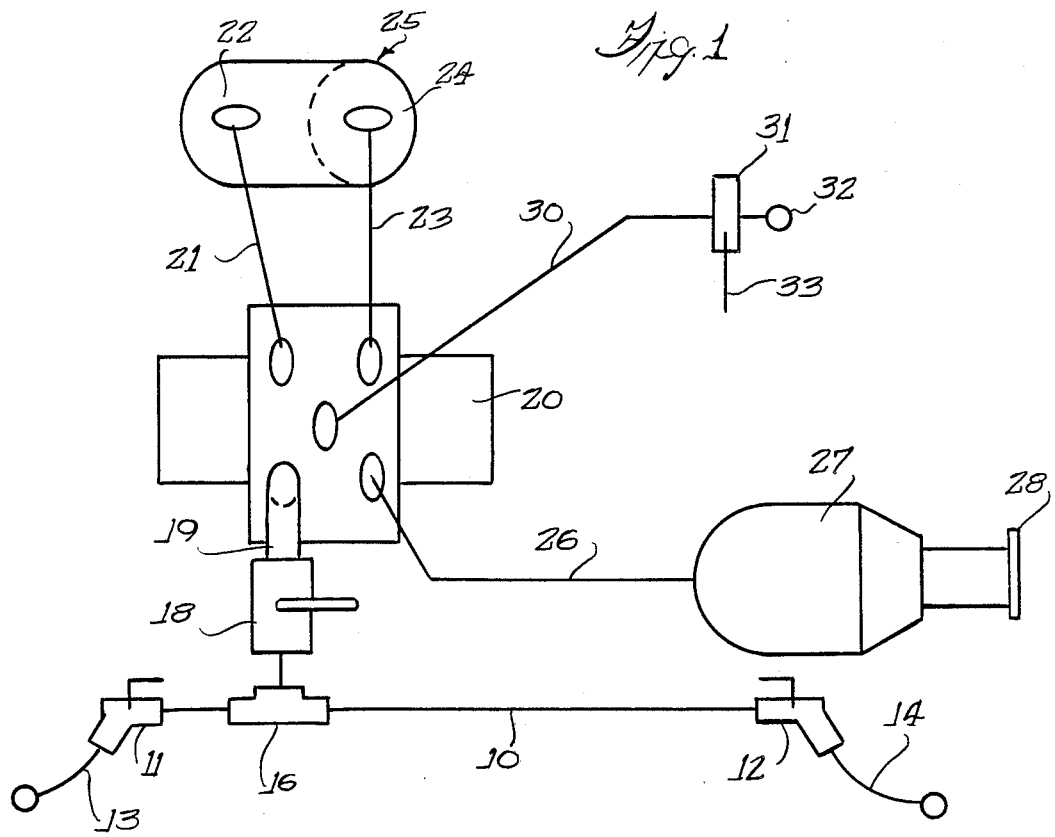
FIG. 1 is a schematic illustration of a known brake system for a single freight car and a single brake cylinder.

Turning first to FIG. 1, there is shown a known brake system in more or less common use on railroad freight cars. A brake pipe 10 extends the length of the car between stop cocks 11 and 12; the cocks are usually located at opposite ends of the car. A forward coupling 13, which can be flexible, is connected to relatively forward cars or to the locomotive (not shown), and another coupling 14 is connected to rearward cars (not shown). If this system is installed on a car which happens to be the last car in the train, the stop cock 12 is closed and the flexible coupling 14 is not connected. Usually the brake pipe 10 is formed of heavy duty (e.g., schedule 80) pipe, and is adapted to accept pressurized air from an air pump commonly located on the locomotive. A tee 16 directs air from the brake pipe 10 to a cutout cock and dirt collector 18, which is often referred to as an isolator valve.

Compressed air flowing through the isolator valve 18 is routed by suitable piping 19 to a standard control valve 20 of known construction. Such valves are commercially offered by the WABCO Division of American Standard Corporation of Wilmerding, Pennsylvania. The valve 20 could be a WABCO ABD valve, or a WABCO ABDW valve, or a valve offered by some other company. When the brakes are not applied, the control valve 20 routes sufficient air through suitable piping 21 to a so-called auxiliary reservoir 22 so as to fill the reservoir to a preset pressure. The control valve 20 also routes compressed air along a line 23 to an emergency reservoir 24. It is common practice for the auxiliary reservoir 22 and the emergency reservoir 24 to be provided in a single, unitized vessel 25.

A brake line 26 leads from the control valve 20 to a brake cylinder 27 of known construction and design. This brake cylinder 27 is connected to a brake shoe or other mechanical braking elements 28.

When the train engineer desires to brake the train, he operates a control of known design so as to lower pressure throughout the brake pipe 10 in a rapid but controlled way. This drop in brake pipe pressure is transmitted through the connecting piping 19 to the control valve 20.

When the control valve 20 senses this controlled drop in pressure, it operates to direct air from the auxiliary reservoir 22 to the brake cylinder 27 along lines 21 and 26. If the brake pipe 10 should become disconnected or otherwise suffer a sudden and massive loss of air pressure, the control valve 20 directs air from the emergency reservoir 24 to the brake cylinder 27 so as to provide a forceful, emergency braking action.

Brake release is caused by a rise in pressure in the brake pipe 10. When the pressure rises in the line 10 and connecting piping 19, the control valve 20 permits air to travel from the brake cylinder 27 and line 26 through an exhaust line 30 and a release control retainer 31 so as to escape to the surrounding atmosphere through a suitable vent 32. If desired, a manual control 33 can be provided at the retainer 31 so as to attenuate the loss of brake air from the lines 30, 26 and in order that braking action will not dissipate more quickly than desired by the railroad personnel.

Figure 2:
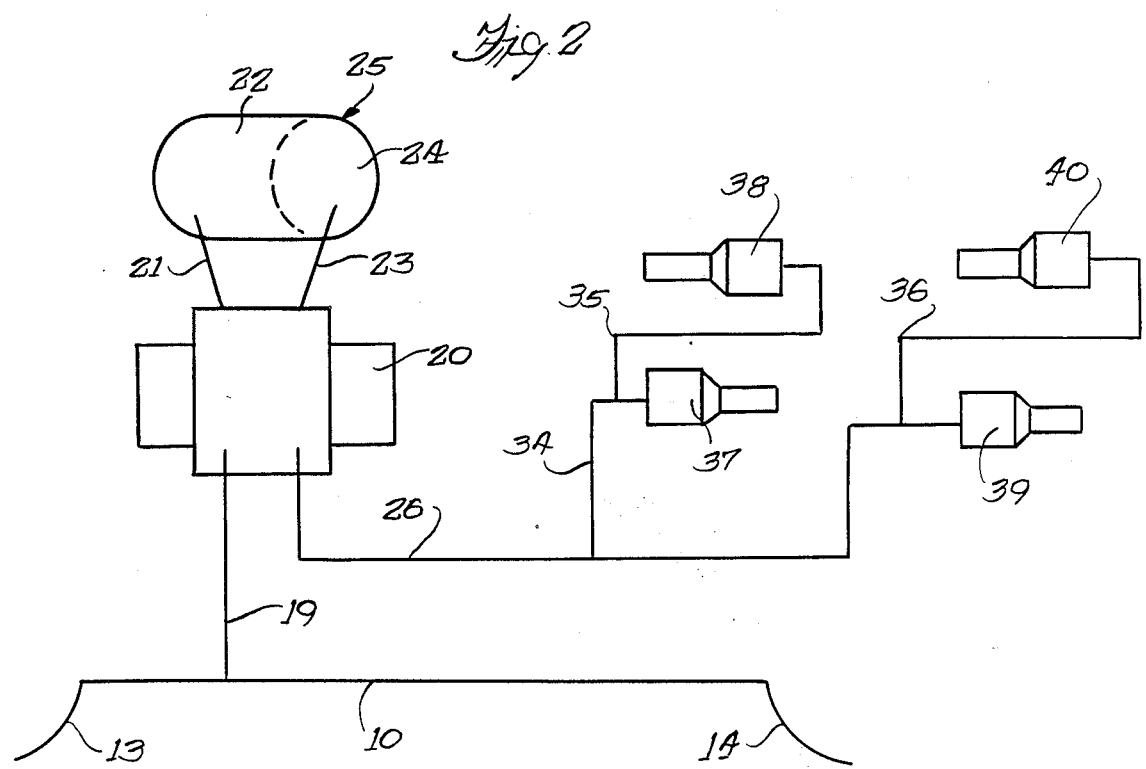
FIG. 2 is a schematic illustration of a similar brake system for a plurality of brake cylinders.

A somewhat similar system is illustrated in FIG. 2. Here, the control valve 20 directs braking air along the brake line 26 and branch conduits 34, 35, and 36 to four brake cylinders 37–40. These cylinders 37–40 can be mounted on the railroad cars so as to operate a brake shoe acting directly on a car wheel, or the brake cylinders can be organized in tandem to apply pressure to brake beams, or other known arrangements or parts can be utilized. But only a limited number of brake cylinders 37–40 can be operated by a system configured as shown, because the reservoir 22 can supply only a limited amount of air pressure. The maximum number of cylinders which can be operated depends upon the size of the cylinders, the piston travel in each cylinder and other factors.

Figure 3:
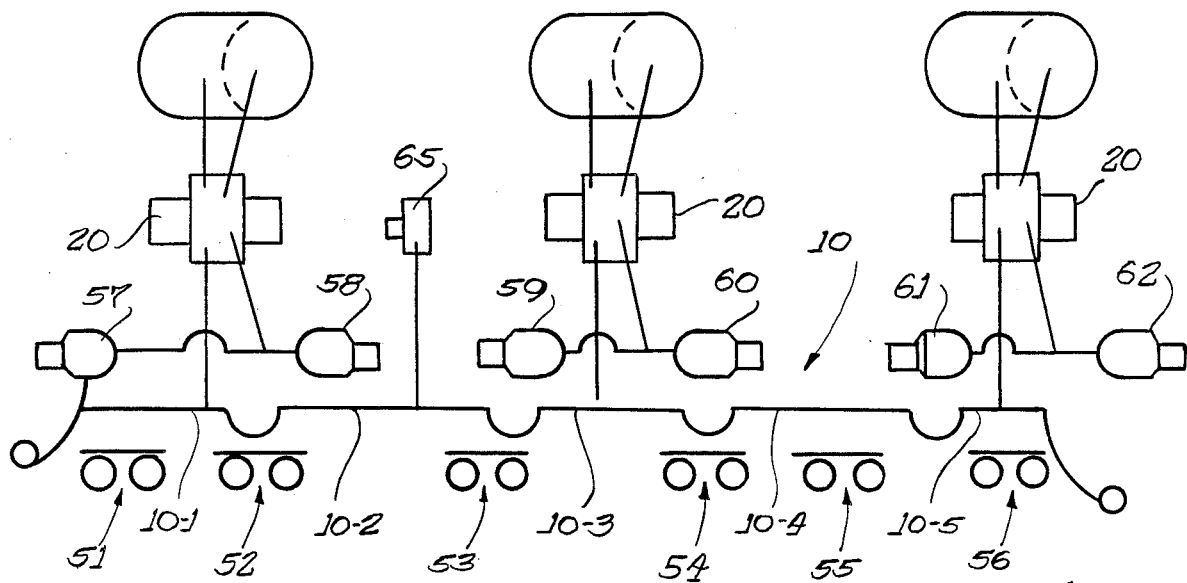
FIG. 3 is a schematic illustration of a similar brake system modified for use with a unitized multi-car freight train.

In FIG. 3, a known braking system has been adapted for use with a unit train. In accordance with known unit train practice, the train includes a series of permanently coupled car unit bodies; adjacent ends of adjacent car bodies are supported by a single railroad car truck. Here, a series of brake pipes 10-1 through 10-5 are suggested above a series of unit train trucks 51–56. A series of identical control valves 20-1, 20-2 and 20-3 each provides pneumatic brake pressure to associated brake cylinders 57–62. Again, each control valve 20 can operate only a limited number of brake cylinders. Accordingly, many expensive control valves are required for a long unit train.

As explained above, the drop in pressure in the brake pipe assembly 10 constitutes the signal to the control valves 20 to apply the brakes. Because this drop-in-pressure signal can become distorted or lost over a brake pipe 10 of extended length, a feed-back relay valve 65 can be provided to amplify and sharpen the brake-application signal as it travels down the brake pipe 10.

Figure 4:
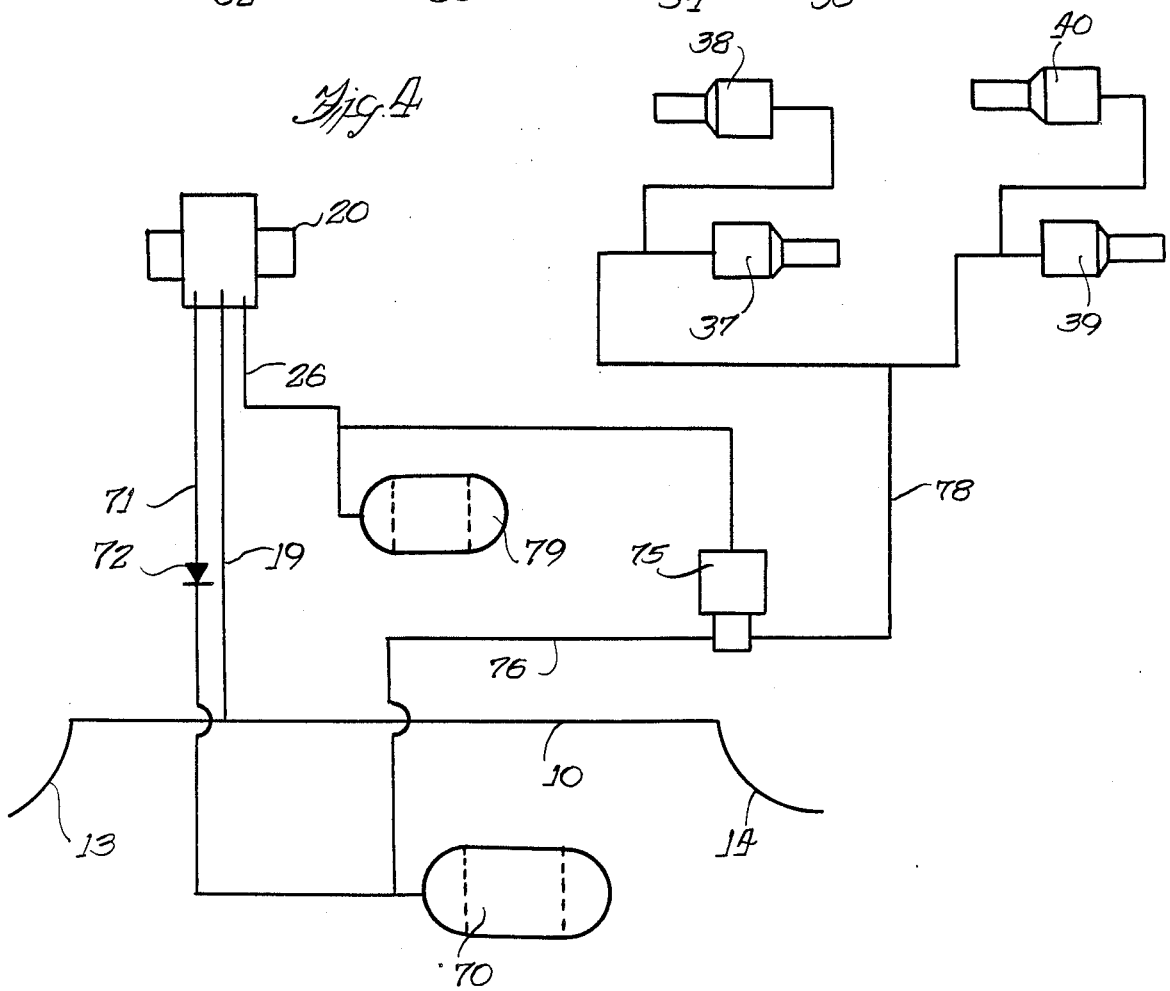
FIG. 4 is a schematic illustration of a brake system re-organized to use a novel relay valve.

In accordance with one aspect of the invention, braking action of maximum effectiveness can be made available at a relatively large number of brake cylinders, and yet the system requires a minimum number of expensive control valves. To accomplish this, a braking system can be organized as illustrated in FIG. 4. Here, air pressure and braking signals are provided to a control valve 20 from a brake pipe 10 and conduit 19 in known manner. However, each railroad car is provided with a brake air supply reservoir tank 70; this tank 70 is pressurized by air from the brake pipe 10 via a reservoir feed line 71 through a one-way check valve 72. When a brake-application signal is received by the control valve 20 from the brake line 10, the valve 20 directs increased compressed air pressure down the brake line 26 in the manner described above. However, this pilot signal increase in air brake pressure is directed to a relay valve 75, which can be of the novel type described below. Upon receipt of the brake-application pilot signal, the relay valve 75 receives air from the large reservoir 70 and a supply line 76, and directs that brake air via downstream piping 78 to several brake cylinders 37–40. The air volume or pressure fluctuations in the supply signal line 26 can be accommodated by a connected overflow volume reservoir 79.

Figure 5:
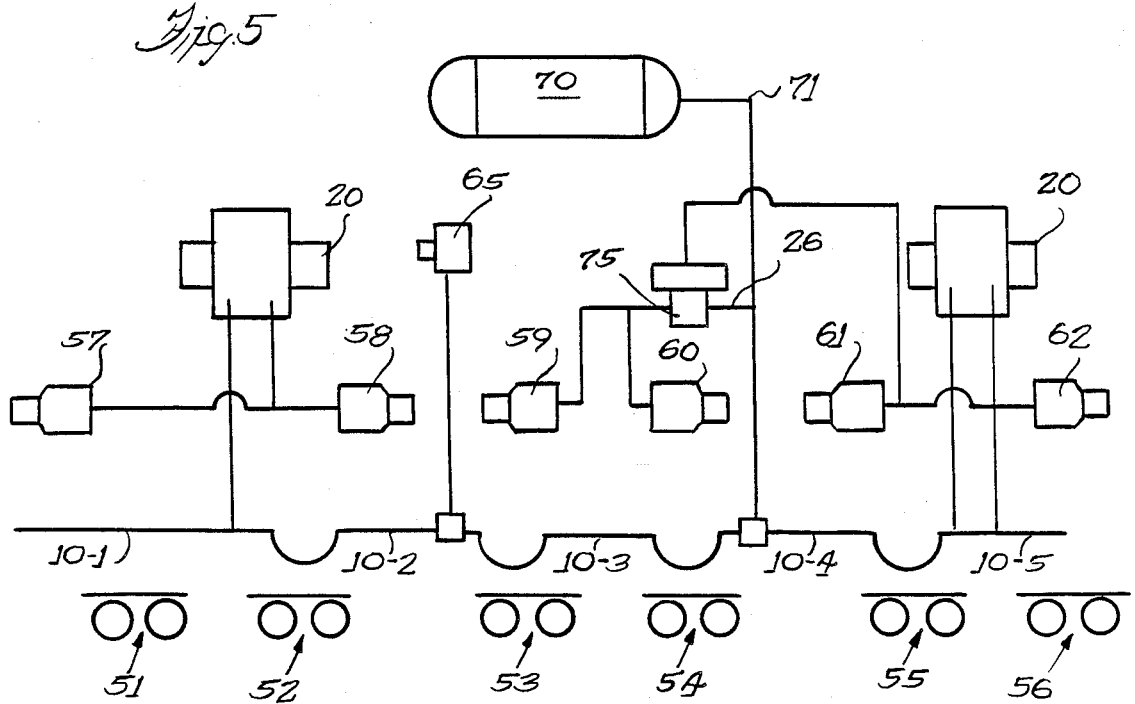
FIG. 5 is a schematic illustration of a brake system for a unitized, multi-car train, the system being arranged to use a novel relay valve.
Figure 12:
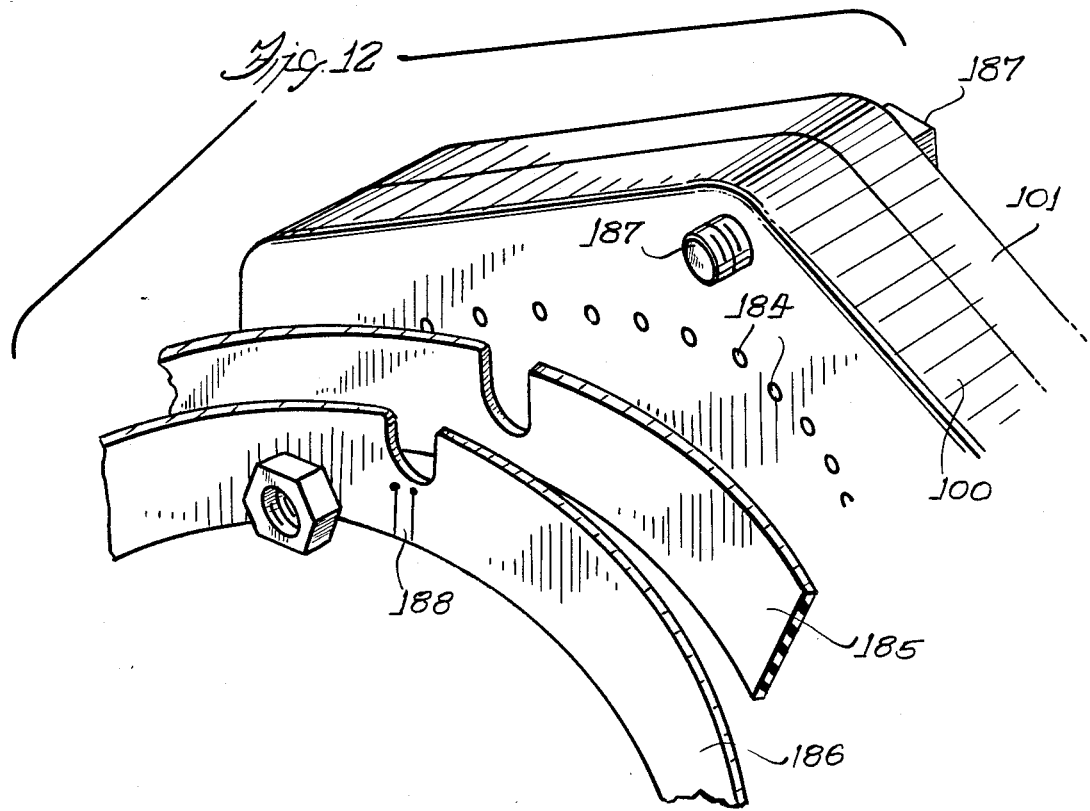
FIG. 12 is a fragmentary exploded view of a portion of the novel relay valve shown in FIGS. 7 and 10.

This pilot-signal concept can be utilized in unitized trains as suggested in FIG. 5. Here, a relay valve 75 is connected into the brake line 26 so as to operate a number of brake cylinders 59 and 60. It will be understood that not every car body unit need be equipped with a reservoir 70 or a control valve 20, as the drawing suggests. This elimination of expensive valves can result in a surprising reduction in unit train brake system costs.

The system of FIG. 4 is shown in a reorganized format in FIG. 6. Here, two brake cylinders 37 and 38 are supplied with brake air from a relay valve 75 when a brake-application signal is delivered to that valve 75 from a brake line and a control valve 20. Air from a car-mounted reservoir 70 is supplied through the valve 75 to the brake cylinders 37, 38. This cylinder or reservoir 70 can be filled by line 71 operating through a check valve 72 from the control valve 20.

The novel relay valve 75 is illustrated in detail in FIGS. 7–12. As particularly shown in FIGS. 7 and 9, the valve 75 includes a housing 100, 101, secured by bolts 102 to a convenient part of the freight car 103. Pressurized brake air is routed to this valve 75 from an upstream reservoir 70 (FIGS. 4 and 6) or other convenient source. The air is delivered to a valve inlet port 105 and then along a passage 106 to a chamber 107.

Brake-application signal pressure is delivered to a pilot port 109 from the brake line 26 (FIGS. 4 and 6). Brake line air pressure arriving at the pilot inlet port 109 is routed along passages 110, 111 and 112 to a chamber 113 which is partially defined by a flexible diaphragm 114. When the chamber 113 is pressurized by pilot or brake line air, the diaphragm 114 is driven to the left in the configuration illustrated in FIG. 7. This leftward diaphragm motion forces an inflexible diaphragm follower 115 to the left in a corresponding manner.

Diaphragm 114 movement first operates to open a pilot or secondary valve 120 so as to begin the delivery of brake air pressure to the brake cylinders in a controlled manner. Here this secondary valve 120 is located within a spool 122 of a cooperating primary or main valve 150. The secondary valve 120 includes a rod member 124 extending to a right end 125 located for engagement by the diaphragm follower 115. As the diaphragm follower 115 moves to the left, the rod member 124 also moves to the left so as to move a solid disc-like valve seal member 126 away from an opening in a secondary valve seat member 127. The seat member 126 is normally urged into valve-closed, air-flow-interdicting, sealing arrangement with the seat member 127 by a spring 128 confined within the spool 122 by a lip 129. A guide spider 131 in a spool bore 132 guides motion of the rod 124. An aperture 133 in a spool end 134 permits air to flow from the chamber 107 down the interior 132 of the spool 122, through the pilot or secondary valve 120 and radially outwardly through reliefs 136 formed in the end 137 of the spool 122. The pressurized air then moves through the larger, surrounding collector chamber 140 and down passages 141 to the outlet port 142 for delivery to brake lines 78 (FIG. 4) and the downstream brake cylinders 37–40. If desired, the spool end 137 can be retained and guided by a cylinder-like guide 139 affixed to the follower 115.

After the pilot or secondary valve 120 has been opened to begin delivery of brake air to the brake cylinders, the primary valve 150 is opened. This valve 150 includes a solid disc 151 extending radially from the spool 122 and having a continuous rim 152 for engaging a valve seat member 154. Here, this seat member 154 includes a resilient seat surface 155, and the member 154 is mounted in a bore 156 by a snap ring 158. An O-ring 160 of the usual sort is carried in a recess 161 to inhibit air and pressure leakage.

After the diaphragm follower 115 engages the end 137 of the spool 122, the spool and valve seal rim 152 are moved away from the seat 154. Radially outwardly of the solid disc 141 is a spider-like configuration having legs 153 and apertures 155, (see FIG. 8) through which the air passes. The air then moves between the rim 152 and seat 156, through the hollow interior 163 of the seat 154, and into the surrounding downstream collector chamber 140. From this chamber 140, the pressurized air can pass along the conduits 141 to the outlet port 142 for delivery to the outlet port 142 and then to the brake cylinders. The spider legs 153 extend radially outwardly from the disc 151 for guiding primary valve motion in a bore 157.

When the brakes are to be released, pressure in the brake pipe 10 is increased, and the control valve 20 releases air pressure from the relay valve 75 and line 26 to atmosphere via the line 30 and release control retainer 31 (FIG. 6). As pressure drops in the passages 110–112 and chamber 113, the diaphragm 114 moves to the right, and a spring 170 urges the primary valve disc 151 to the right so as to cause the rim 152 to re-engage the valve seat 156 and thus close the primary valve 150. A spring 176 assists the cross-diaphragm pressure differential in moving the diaphragm 114 to the right. Simultaneously, the secondary valve spring 128 urges the valve member 126 against the secondary valve seat 127 to close the secondary valve.

In carrying out the invention, this relay valve 75 permits air pressure in the brake cylinders and brake lines to be reduced or exhausted to atmosphere through a diaphragm-utilizing check valve arrangement 173. When the diaphragm 114 moves to the right, it separates from a diaphragm seat 180 which takes the form of an endless annular lip. Air is thus permitted to pass from the main collector chamber 140, past the follower 115, around the lip 180, and down any one of a series of small exhaust bores 182 to exhaust ports 184 at the outside of the valve.

It will be noted that the diaphragm 114 acts both as an actuator for the valves 120 and 150 and as part of the exhaust check valve 173. In accordance with the invention, this minimization of parts reduces the cost of the relay valve.

Air moving along the bores 182 and through the ports 184 then escapes around a rubber diaphragm 185 which can be protected from the weather by an overlying metal diaphragm 186. (FIG. 12) These two diaphragms 185 and 186 can be secured to the housing 100 by any convenient means such as bolts 187 which secure together the housing portions. The metal diaphragm 186 restricts motion of the flexible diaphragm 184, and the diaphragm 184 inhibits the entry of contaminants into the relay valve. If desired, reed-like sections 188 can be partially cut into the metal diaphragm 186 to permit increased sensitivity and movement of the flexible diaphragm 184.

An alternate embodiment of the valve 75 is shown in FIGS. 10 and 11. Here, a diaphragm assembly 200 is provided to permit the valve 75 to operate at a pressure differential. This diaphragm assembly 200 includes a first diaphragm 214; spaced apart from the first diaphragm 214 is a second diaphragm 216. Extending between the diaphragms 214 and 216 is an annular piston 218, and a central piston 220 is located substantially within the annular piston 218. This annular piston 218 defines an annular relief 222, and the central piston 220 includes an annular rim 224 which mates with the annular piston relief 222.

It will be noted that the pistons 218 and 220 can move through restricted ranges of motion, and that these piston motions can be independent of one another under some circumstances. When the chamber 113 is pressurized, the annular piston 218 forces the diaphragm 216 against the lip 180 to securely seal the exhaust valve. The piston 220 has a relatively reduced area abutting the diaphragm 214, and so a relatively high pressure is required to operate the valves 120 and 150. But the diaphragms 216 and 214 can be easily moved to the right to close the valves 120 and 150 and open the check valve 173, because the combined piston 218 and 220 present a relatively large area to the air pressure in the chamber 140. This arrangement provides a dead band in valve operation, thereby inhibiting valve flutter.

What is claimed is:

1. A relay valve for controlling pneumatic pressure in a railroad brake cylinder, the valve comprising, in combination, an inlet for receiving pressurized air from a remote source, a primary valve including a primary valve member, and a primary valve seat cooperating with the primary valve member to normally interdict the downstream flow of pressurized air arriving at the inlet, a secondary valve including a secondary valve member, and a secondary valve seat cooperating with the secondary valve member to normally interdict the flow of pressurized air from the inlet, an outlet for receiving air from the primary and secondary valves and permitting that pressurized air to flow to downstream brake cylinders, a pilot port for receiving control pressure from a control source, diaphragm means movable by the control pressure to open first the secondary and then the primary valves and thus permit pneumatic pressure from the remote source to more toward the brake cylinder, a check valve mechanism for permitting pressurized air located downstream of the primary and secondary valves to escape from the relay valve when pressure at the pilot port is reduced below a preset value, the check valve mechanism including the diaphragm means, a check valve seat located for selective engagement by the diaphragm means, a collector chamber located downstream of the check valve seat, and at least one exhaust passage communicating with the collector chamber and extending to an exhaust port at the outside of the relay valve to permit air to escape from the relay valve when the diaphragm means is moved away from the check valve seat, and an exhaust diaphragm extending over said exhaust valve port for inhibiting the entry of contaminents into the relay valve, and an exhaust diaphragm cover overlying the exhaust diaphragm to inhibit excessive exhaust diaphragm movement.

2. A relay valve according to claim 1 wherein said diaphragm means includes and inflexible diaphragm follower positioned to engage and follow the motion of one of said flexible diaphragms.

3. A relay valve according to claim 2 further including guide means affixed to said diaphragm follower and located to receive and guide the motion of said primary valve member.

4. A relay valve according to claim 1 including an annular piston defining an annular relief, and a central piston including an annular rim mating with said annular piston relief, the piston acting so that greater pressure is required to move the piston and diaphragm toward the primary and secondary valves than is required to move the piston and diaphragms away from the primary and secondary valves.

5. A relay valve for controlling pneumatic pressure in a railroad brake cylinder, the valve comprising, in combination, an inlet for receiving pressurized air from a remote source, a primary valve including a primary valve including a primary valve spool member, and a primary valve seat member cooperating with the primary valve spool member to normally interdict the downstream flow of pressurized air arriving at the inlet, a disk extending radially from the spool member and having a rim for engaging the primary valve seat member, and a plurality of spider legs extending radially outwardly from the disk for guiding motion of the primary valve seat member, a secondary valve including a secondary valve member, and a secondary valve seat cooperating with the secondary valve member to normally interdict the flow of pressurized air from the inlet, an outlet for receiving air from the primary and secondary valves and permitting that pressurized air to flow to downstream brake cylinders, a pilot port for receiving control pressure from a control source, and diaphragm means movable by the control pressure to open first the secondary and then the primary valves and thus permit pneumatic pressure from the remote source to move toward the brake cylinder.

6. A relay valve according to claim 5 wherein said spool member extends for engagement by said diaphragm means.

7. A relay valve according to claim 5 wherein said spool member is hollow, and wherein said secondary valve is located at least partly within said spool member.

8. A relay valve according to claim 7 wherein said secondary valve includes a rod member extending for engagement by the diaphragm means, a guide spider for guiding rod member reciprocal motion inside said spool member, a valve seat member, and a solid disk member carried by said rod member for selective sealing engagement with said valve seat member.

9. A relay valve according to claim 8 wherein said secondary valve seat member is located inside said primary valve spool member.

* * * * *

UNITED STATES PATENT OFFICE
CERTIFICATE OF CORRECTION

Patent No. 4,768,556          Dated September 6, 1988

Inventor(s) James G. Rees

It is certified that error appears in the above-identified patent and that said Letters Patent is hereby corrected as shown below:

Column 7, Line 6, the word "more" should be -- move --;

Signed and Sealed this

Fourth Day of July, 1989

*Attest:*

DONALD J. QUIGG

*Attesting Officer*     *Commissioner of Patents and Trademarks*